(No Model.)

R. B. MORRISON.
TILE, PIPE, AND SEWER PROTECTOR.

No. 292,035. Patented Jan. 15, 1884.

Witnesses:
Modestus Bauer
Edwin R. Hitt

Inventor:
Rob't B. Morrison

UNITED STATES PATENT OFFICE.

ROBERT B. MORRISON, OF VINCENNES, INDIANA.

TILE, PIPE, AND SEWER PROTECTOR.

SPECIFICATION forming part of Letters Patent No. 292,035, dated January 15, 1884.

Application filed March 19, 1883. (No model.)

*To all whom it may concern:*

Be it known that I, ROBERT B. MORRISON, a citizen of the United States, residing at Vincennes, in the county of Knox and State of Indiana, have invented certain new and useful Improvements in Tile, Pipe, and Sewer Protectors; and I do hereby declare the following to be a full, clear, and exact description of the invention, such as will enable others skilled in the art to which it appertains to make and use the same.

My invention relates to devices for preventing animals entering houses and other places through the sewers, tiles, or pipes connected with said places. The devices heretofore used were attached directly to the sewer, tile, or pipe, and separate sizes were used for separate pipes.

The object of my invention is to provide a device which is adapted to fit any sewer, tile, or pipe; and to that end it consists of combinations and constructions, all as will hereinafter be described, and pointed out in the claims.

Figure 1:
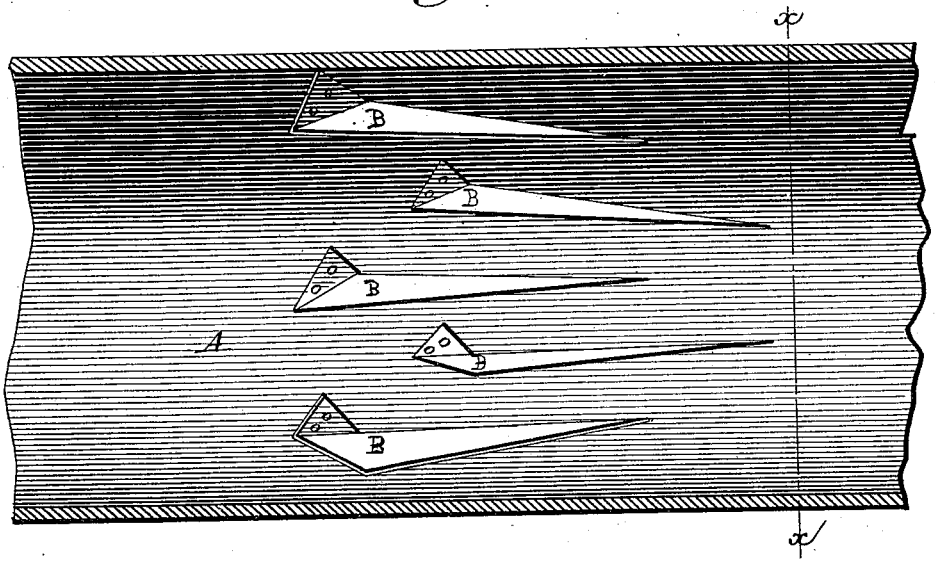
Figure 2:
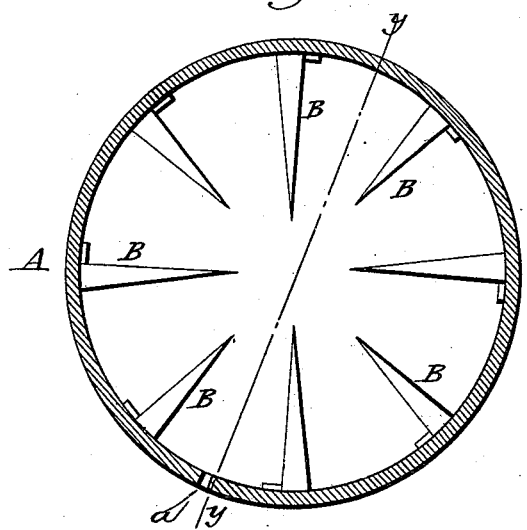

Referring to the drawings, Figure 1 represents a longitudinal section on line $y$ $y$, Fig. 2; and Fig. 2, a vertical section on line $x$ $x$, Fig. 1.

A represents a cylinder of any suitable flexible material, and having a longitudinal slit, $a$, which extends from end to end, to permit of the cylinders being expanded or contracted. The edges of the cylinder forming this slit may be beveled, so that they will readily move over each other when the cylinder is reduced or increased in size by pressure, respectively exerted upon or released from the cylinder.

The object in making the cylinder in this way is to adapt it to the different sizes of sewers, tiles, or pipes in common use for draining, &c.

Another advantage consists in the facility with which it can be inserted in the sewers, &c., as it can be contracted to less size than the bore of the sewer, &c., and inserted in the latter. As soon as the contracting pressure is removed the cylinder expands and holds itself in place. It is obvious that its removal can be effected in as simple a manner. By this means I am enabled to dispense with all other means of fastening the protector to the sewer, &c.

Upon the interior of the cylinder I propose to place some device to prevent animals from entering. My preferred form is that shown in the drawings. It consists of a number of angular strips, B, attached to the cylinder at suitable intervals and projecting toward the outer end of the cylinder in such manner as to form, preferably, a truncated cone through which refuse and animals may pass to the outlet. The pointed ends of the strips will prevent the animals from returning.

What I claim as new is—

1. In a sewer, tile, or pipe protector, a cylinder having a longitudinal slit, and m ans therein for preventing animals from passing through, substantially as described.

2. In a sewer, tile, or pipe protector, a cylinder having a series of strips fastened by one end to the shell of the cylinder and their other end inclining toward the axis thereof, substantially as described.

3. In a sewer, tile, or pipe protector, a cylinder having a longitudinal slit, and a series of strips fastened by one end to the shell of the cylinder and their other end inclining toward the axis thereof, substantially as described.

In testimony whereof I affix my signature in presence of two witnesses.

ROBERT B. MORRISON.

Witnesses:
 GEO. G. REILY,
 WM. C. NIBLACK.